United States Patent
Nogami

[19]

[11] Patent Number: 6,128,083
[45] Date of Patent: Oct. 3, 2000

[54] DISPLACEMENT MEASURING APPARATUS

[75] Inventor: Asahiko Nogami, Tokyo, Japan

[73] Assignee: Sony Precision Technology Inc., Tokyo, Japan

[21] Appl. No.: 09/287,046

[22] Filed: Apr. 6, 1999

[30]   Foreign Application Priority Data

Apr. 8, 1998   [JP]   Japan   .................................   10-096299

[51] Int. Cl.$^7$ .................................................. G01B 9/02
[52] U.S. Cl. ........................... 356/358; 356/345; 356/346
[58] Field of Search ..................... 356/345, 358, 356/356

*Primary Examiner*—Robert H. Kim
*Attorney, Agent, or Firm*—Jay H. Maioli

[57]   ABSTRACT

The displacement measuring apparatus of a laser interference technology includes a probe 3 which delivers at a photodetector 17 an RF signal of which a modulated component proportional to a displacement of an object 2 under measurement. The apparatus has also a phase-demodulation circuit 9 in which an interference signal produced by shifting the frequency of the RF signal to an intermediate frequency is phase-demodulated on the basis of the carrier signal for supply to a light modulator 16. Thus the apparatus can detect a displacement of the object with a high resolution.

1 Claim, 6 Drawing Sheets

DISPLACEMENT MEASURING APPARATUS

BACKGROUND OF THE INVENTION

1. Field of the Invention

The present invention relates to a displacement measuring apparatus for measuring a displacement of an object by irradiating a laser beam to the object, and more particularly, to a displacement measuring apparatus adapted to optically modulate, using a carrier signal of a predetermined frequency, either of laser beams for irradiation to a reference mirror and an object whose displacement is to be measured, respectively, and measure a displacement of the object on the basis of an interference signal produced by interference between reflected laser beams from the reference mirror and object, respectively.

2. Description of Related Art

Heretofore, displacement measuring apparatuses have been proposed which make the use of the laser interference technology to detect a vibration and moved position of an object in a non-contact manner. As one of such displacement measuring apparatuses, a fringe counting type one is generally used.

Figure 1:
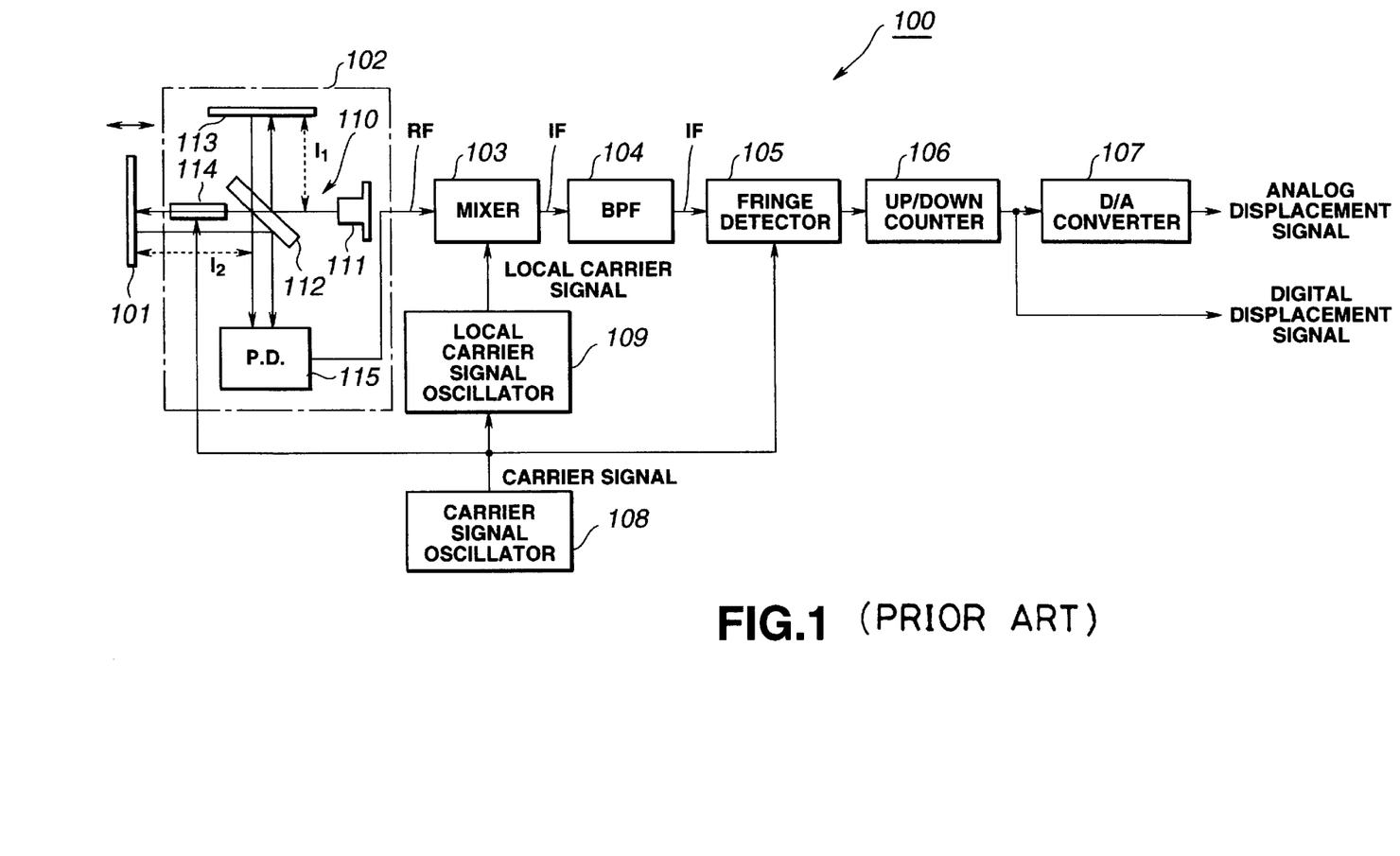
FIG. 1 is a schematic block diagram of the conventional displacement measuring apparatus.

Referring now to FIG. 1, there is illustrated in the form of a schematic block diagram a conventional displacement measuring apparatus of the fringe counting type.

In FIG. 1, the conventional displacement measuring apparatus is generally indicated with a reference 100. As shown, the apparatus 100 comprises a probe 102 to produce an RF signal by irradiating a laser beam to an object 101 whose displacement is to be measured and modulating a laser beam component developed due to the displacement of the object, a mixer circuit 103 to convert the RF signal to an IF signal, a bandpass filter (will be referred to simply as "BPF" hereinafter) 104 to filter the IF signal, a fringe detection circuit 105 to detect a fringe component of the IF signal filtered by the BPF 104, an up/down counter (will be referred to simply as "U/D counter" hereinafter) 106 to count the detected fringe component and produce a digital displacement signal, a digital/analog converter (will be referred to simply as "D/A converter" hereinafter) 107 to convert the digital displacement signal from the U/D counter 106 to an analog displacement signal, an carrier signal oscillator (will be referred to simply as "carrier OSC" hereinafter) 108 to produce a carrier signal, and a local carrier signal oscillator (will be referred to simply as "local OSC" hereinafter) 109 to produce a local carrier signal on the basis of the carrier signal from the carrier signal oscillator 108.

The probe 102 comprises an interference optical system 110 incorporating a laser diode 111 to emit a laser light, beam splitter 112 to split the laser light into two beams and combine reflected split laser beams, reference mirror 113 and a light modulator 114 to optically modulate the laser beam, which interference optical system 110 producing an interference light by interference between a reflected laser beam from the reference mirror 113 and a one from the object 101, and further a photodetector 115 to detect the interference light and photoelectrically convert it.

The laser diode 111 emits a laser light of a predetermined wavelength. The emitted laser light is split by the beam splitter 112 into two beams. One of the split laser beams is irradiated to the reference mirror 113 fixed inside the probe 102, while the other beam is irradiated to the object 101 through the light modulator 114 which will optically modulate the laser beam irradiated to the object 101 using a carrier signal supplied from the carrier OSC 108.

The beam splitter 112 works also to combine a reflected laser beam from the object 101 and a one from the reference mirror 113 to produce an interference light. The photodetector 115 detects the interference light produced by the beam splitter 112 and optically converts it.

The probe 102 having the above-mentioned construction modulates, using the carrier signal, a laser beam component developed due to a displacement of the object 101 to produce an RF signal, and delivers it at the photodetector 115.

The mixer circuit 103 is supplied with the RF signal from the probe 102, and converts it to an IF signal of an intermediate frequency on the basis of a local carrier signal from the local OSC 109.

The BPF 104 is supplied with the IF signal from the mixer circuit 103 to filter an IF signal component in a predetermined frequency band.

The fringe detector circuit 105 is supplied with the filtered IF signal from the BPF 104, and detects a fringe component of the IF signal on the basis of the carrier signal supplied from the carrier OSC 108. Namely, the fringe detector circuit 105 detects an interference fringe component of the interference light produced by interference between the reflected laser beams from the reference mirror 113 and object 101, respectively.

The U/D counter 106 counts up or down the interference fringe component detected by the fringe detector circuit 105 to detect a displacement of the object 101, and provides the result of detection as a digital displacement signal.

The D/A converter 107 converts the digital displacement signal to an analog signal.

The conventional displacement measuring apparatus 100 of the fringe counting type having the aforementioned construction functions as will be described below:

Since the reference mirror 113 is fixed inside the probe 102, the distance $l_1$ between the beam splitter 112 and reference mirror 113 will not vary. On the other hand, since the object 101 moves in parallel with the irradiated direction of the laser beam, the distance $l_2$ between the beam splitter 112 and object 101 will vary.

Assume here that the light modulator 114 is not provided in the interference optical system 110. In this case, an interference light is produced as will be described below. For instance, when there is no optical-path difference between the distances $l_1$ and $l_2$, the reflected light from the reference mirror 113 is in phase with that from the object 101, so that the interference light will be bright. When the object 101 moves so that the optical-path difference between the distances $l_1$ and $l_2$ is $\lambda/2$ ($\lambda$ is the wavelength of laser beam), the reflected light from the reference mirror 113 is in phase opposition to that from the object 101, thus the interference light will be dark. Therefore, if the light modulator 114 is not provided in the interference optical system 110, an interference light will take place in which bright and dark interference fringes develop each time the object 101 moves over a distance of $\lambda/2$.

On the other hand, in the conventional displacement measuring apparatus 100 having the light modulator 114 provided in the interference optical system 110, the light modulator 114 modulates the phase of the laser beam. Thus, an interference light produced in this displacement measuring apparatus 100 will cause bright and dark interference fringes corresponding to modulation frequencies even if there is no optical-path difference between the distances $l_1$ and $l_2$. The interference fringes of the interference light will change correspondingly to the optical-path difference between the distances $l_1$ and $l_2$ if the optical-path difference varies.

Therefore, in the conventional displacement measuring apparatus 100, as the object 101 moves, an interference light can be produced in which bright and dark interference fringes corresponding to modulation frequencies vary.

In the conventional displacement measuring apparatus 100, after such an interference light is detected by the photodetector 115, the interference fringes in the interference light are counted by the fringe detector circuit 105 to detect a moved distance, or displacement, of the object 101.

However, since the conventional displacement measuring apparatus 100 of the fringe counting type is adapted to count the interference fringes in the interference light, the resolution of displacement detection depends upon the wavelength of the laser beam. Therefore, the conventional apparatus can hardly detect a displacement of the object 101 with a high resolution.

SUMMARY OF THE INVENTION

Accordingly, the present invention has an object to overcome the above-mentioned drawbacks of the prior art by providing a displacement measuring apparatus which can detect a displacement of an object under measurement with a high resolution utilizing a laser interference technology.

Also, the present invention provides a displacement measuring apparatus which can reset a detection output to zero regardless of the position of an object under measurement utilizing a laser interference technology.

The above object can be achieved by providing a displacement measuring apparatus comprising, according to the present invention: an interference optical system incorporating a laser source to emit a laser light for irradiation to a reference mirror and an object under measurement; and a light modulator to optically modulate either of laser beams for irradiation to the reference mirror and object, respectively, using a carrier signal of a predetermined frequency, which interference optical system being adapted to produce an interference light by interference between reflected laser beams from the reference mirror and object, respectively; a photo-detecting element to receive the interference light and detect an interference signal; and a displacement detecting means for detecting a displacement of the object by demodulating the phase of the interference signal on the basis of the carrier signal.

In the displacement measuring apparatus according to the present invention, an interference signal produced by interference between the reflected light beams from the reference mirror and object, respectively, is converted to an electrical signal which in turn will be phase-demodulated to detect a displacement of the object.

According to the present invention, the displacement measuring apparatus further comprises: means for dividing the frequency of the interference signal at a predetermined ratio to produce a frequency-divided interference signal; means for dividing the frequency of the carrier signal at such a ratio as to produce an output frequency identical to the center frequency of the frequency-divided interference signal, to thereby produce a frequency-divided carrier signal; and means for synchronizing a reset signal for supply to the carrier-signal frequency dividing means with the frequency-divided interference signal; the carrier-signal frequency dividing means producing, upon supply of the reset signal synchronized with the interference signal, a frequency-divided carrier signal having with respect to the frequency-divided interference signal such a phase difference that an output after phase-demodulated by the displacement detecting means has a predetermined value; and the displacement detecting means detecting a phase difference between the frequency-divided carrier and interference signals and demodulating the phase of the interference signal.

As mentioned above, according to the present invention, upon supply of the reset signal synchronized with the interference signal, the frequency-divided carrier signal is produced which has with respect to the frequency-divided interference signal such a phase difference that the output after phase-demodulated has the predetermined value, and the phase difference between the frequency-divided carrier and interference signals is detected for phase demodulation of the interference signal.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 2:
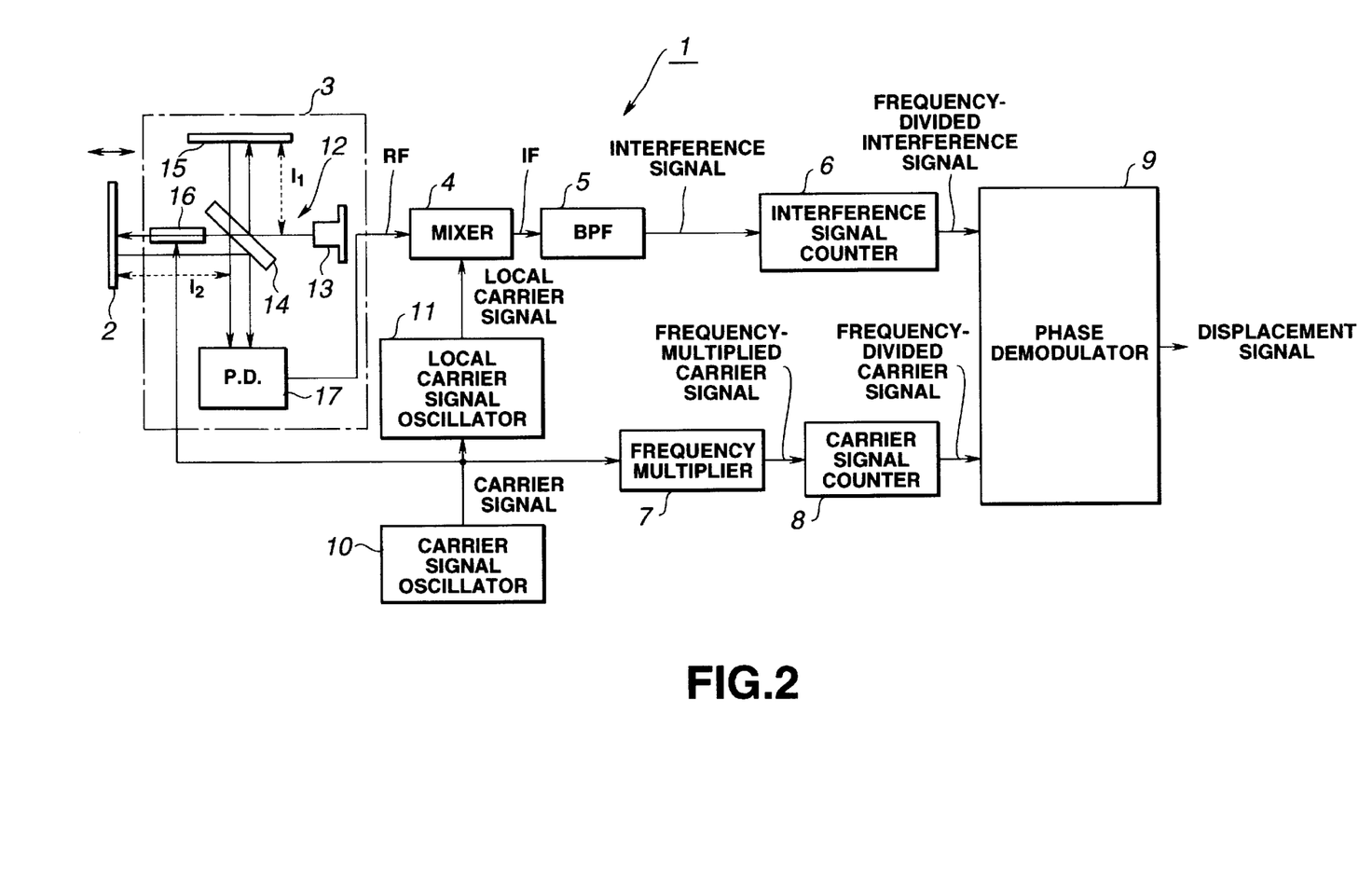
FIG. 2 is also a schematic block diagram of a first embodiment of the displacement measuring apparatus according to the present invention.

Referring now to FIG. 2, there is illustrated in the form of a schematic block diagram the first embodiment of the displacement measuring apparatus according to the present invention.

In FIG. 2, the displacement measuring apparatus according to the first embodiment is generally indicated with a reference 1. As shown, the apparatus 1 comprises a probe 3 to irradiate a laser beam to an object 2 under measurement and produce an RF signal by modulating a displacement of the object 2, mixer circuit 4 to convert the RF signal to an IF signal, BPF 5 to filter the IF signal, interference signal counter 6 to count the leading edge, for example, of the IF signal filtered by the BPF 5 (this filtered IF signal will be referred to as "interference signal" hereinafter) to produce a frequency-divided interference signal, frequency multiplier circuit 7 to multiply the frequency of the carrier signal to produce a frequency-multiplied carrier signal, carrier signal counter 8 to count the leading edge, for example, of the frequency-multiplied carrier signal to produce a frequency-divided carrier signal, phase demodulator circuit 9 to demodulate the phase of the frequency-divided interference signal on the basis of the frequency-divided carrier signal to produce a displacement signal indicative of a displacement of the object 2, carrier OSC 10 to produce a carrier signal, and a local OSC 11 to produce a local carrier signal on the basis of the carrier signal.

The probe 3 incorporates an interference optical system 12 comprising a laser diode 13 to emit a laser light, beam splitter 14 to split the laser light into two beams and combine the reflected split beams, reference mirror 15 and a light modulator 16 to optically modulate the laser beam. In the interference optical system 12, a reflected light from the reference mirror 15 and one from the object 2 are put into interference with each other to produce an interference light. The probe 3 further comprises a photo diode 17 to detect and photoelectrically convert the interference light.

The laser diode 13 emits a laser light of a predetermined wavelength. A laser light emitted from the laser diode 13 is split by the beam splitter 14 into two beams of laser light. One of the laser beams is irradiated to the reference mirror 15 fixed inside the probe 3, while the other is irradiated to the object 2 through the light modulator 16 which will optically modulate the laser beam irradiated to the object 2 with a carrier signal supplied from the carrier OSC 10.

The beam splitter 14 works also to combine a reflected laser beam from the object 2 and one from the reference mirror 15 to produce an interference light. The photodetector 17 detects and optically converts the interference light produced by the beam splitter 14.

The probe 3 having the aforementioned construction functions to produce an interference light as will be described below:

Since the reference mirror 15 is fixed inside the probe 2, the distance $l_1$ between the beam splitter 14 and reference mirror 15 will not vary. On the other hand, since the object 2 moves in parallel with the irradiated direction of the laser beam, the distance $l_2$ between the beam splitter 14 and object 2 will vary.

Assume here that the light modulator 16 is not provided in the interference optical system 12. In this case, an interference light is produced. For instance, when there is no optical-path difference between the distances $l_1$ and $l_2$, the reflected light from the reference mirror 15 is in phase with that from the object 2, so that the interference light will be bright. When the object 2 moves so that the optical-path difference between the distances $l_1$ and $l_2$ is $\lambda/2$ ($\lambda$ is the wavelength of laser beam), the reflected light from the reference mirror 15 is in phase opposition to that from the object 2, thus the interference light will be dark. Therefore, when the light modulator 16 is not provided in the interference optical system 12, an interference light will take place in which bright and dark interference fringes develop each time the object 2 moves over a distance of $\lambda/2$.

On the other hand, in the probe 3 in which the light modulator 16 is provided in the interference optical system 12, the light modulator 16 modulates the phase of the laser beam. Thus, an interference light produced by the probe 3 will have developed therein bright and dark interference fringes corresponding to modulation frequencies even if there is no optical-path difference between the distances $l_1$ and $l_2$. The interference fringes of the interference light will change correspondingly to the optical-path difference between the distances $l_1$ and $l_2$ if the optical-path difference varies.

Therefore, in the probe 3, as the object 2 moves, an interference light can be produced in which bright and dark interference fringes corresponding to modulation frequencies vary.

As mentioned above, in the probe 3, after such an interference light is detected by the photodetector 17 to produce an RF signal by modulating, using a carrier signal, the modulated component proportional to a displacement of the object 2.

The mixer circuit 4 is supplied with the RF signal from the probe 3 to convert the RF signal to an IF signal within an intermediate frequency band on the basis of the local carrier signal supplied from the local OSC 11.

The BPF 5 is supplied with the IF signal from the mixer circuit 4 to filter a component of the IF signal in a predetermined frequency band. The IF signal thus filtered by the BPF 5 is used as an interference signal.

The interference signal counter 6 is supplied with the interference signal from the BPF 5. The interference signal counter 6 is designed as a $2^n$-ary forward counter to count the leading edge, for example, of an interference signal. It provides an output pulse from the most significant bit (MSB) as an interference signal. That is, the interference signal counter 6 works as a frequency divider to divide or the frequency of the interference signal at a predetermined ratio.

The frequency multiplier circuit 7 is supplied with a carrier signal from the carrier OSC 10. It is composed of a PLL (phase-locked loop) circuit, for example, to provide a frequency-multiplied carrier signal produced by multiplying the frequency of the carrier signal at a predetermined ratio.

The carrier signal counter 8 is supplied with the frequency-multiplied carrier signal from the frequency multiplier circuit 7. This carrier signal counter 8 is designed as a $2^n$-ary forward counter to count the leading edge, for example, of a frequency-multiplied carrier signal. It provides an output pulse from the most significant bit (MSB) as a frequency-divided carrier signal. That is, the carrier signal counter 8 works as a frequency divider to divide or the frequency of the frequency-multiplied carrier signal at a predetermined ratio.

The frequency division ratio of the interference signal counter 6, frequency multiplication ratio of the frequency multiplier circuit 7 and the frequency division ratio of the carrier signal counter 8 are set so that the center frequency of the frequency-divided interference signal resulted from modulation of a displacement of the object 2 is identical to the frequency of the frequency-divided carrier signal.

Assume here that the carrier signal has a frequency of 4 MHz and the interference signal has a frequency of 2 MHz, for example. In this case, when the interference signal counter 6 is designed as a 3-bit octal counter, the frequency multiplier circuit 7 as a hexadecimal frequency multiplier and the carrier signal counter 8 as an 8-bit 256-ary counter, both the center frequency of the frequency-divided interference signal and frequency of the frequency-divided carrier signal can be 250 kHz.

The phase demodulator circuit 9 is supplied with the frequency-divided carrier and interference signals to demodulate the phase of the frequency-divided interference signal using the frequency-divided carrier signal as a reference signal. The phase demodulator circuit 9 provides a displacement signal produced by demodulating the phase of the frequency-divided interference signal, as a result of the measurement of a displacement of the object 2.

Next, the interference signal counter 6, carrier signal counter 8 and the phase demodulator 9 will further be described with reference to FIG. 3.

As shown, the interference signal counter 6 is supplied with an interference signal of 2 MHz, for example. The interference signal counter 6 is composed of a 3-bit octal counter to provide a frequency-divided interference signal of 250 kHz from the most significant bit $Q_2$. Namely, the interference signal counter 6 divides by 8 the interference signal.

The carrier signal counter 8 is supplied with a frequency-multiplied carrier signal of 64 MHz, for example. The carrier signal counter 8 is composed of an 8-bit 256-ary counter to provide a frequency-divided carrier signal of 250 kHz from the most significant bit $Q_7$. Namely, it divides by 256 the frequency-divided carrier signal of 64 MHz.

The phase demodulator circuit 9 comprises a first edge detector circuit 21 to detect the leading edge of a frequency-divided interference signal, second edge detector 22 to detect the leading edge of a frequency-divided carrier signal, D flip-flop circuit 23 having a set input terminal (SET) and reset input terminal (RST), and a lowpass filter 24.

The first edge detector circuit 21 detects the leading edge of a frequency-divided interference signal. It serves as a mono-multivibrator. The output of the first edge detector circuit 21 is supplied to the set input terminal (SET) of the D flip-flop circuit 23.

The second edge detector 22 detects the leading edge of a frequency-divided carrier signal. The second edge detector 22 also serves as a mono-multivibrator. The output of the second edge detector circuit 22 is supplied to the reset input terminal (RST) of the D flip-flop circuit 23.

The D flip-flop circuit 23 has both the clock terminal and input terminal (D) pulled up to VCC. Therefore, the output (Q) of the D flip-flop circuit 23 stays high from a period of time since a pulse is supplied to the set input terminal (SET) thereof until a pulse is supplied to the reset input terminal (RST). That is, a time for which the output (Q) stays high indicates a displacement of the object 2.

The lowpass filter 24 produces a displacement signal by removing a high frequency component such as carrier signal, etc. from the output signal supplied from the D flip-flop circuit 23.

It should be noted that the D flip-flop circuit 23 in the phase demodulator circuit 9 may be replaced with any other flip-flop circuit which has a set/reset function. If the D flip-flop circuit 23 is of an edge-triggered type, the first and second edge detector circuits 21 and 22 may not be provided in the phase demodulator circuit 9.

The phase demodulator circuit 9 using such a D flip-flop circuit 23 provides a displacement signal which will be zero when the phase difference between the frequency-divided interference and carrier signals is 180 deg. The dynamic range of the output displacement signal from the circuit 9 is ±180 deg. with respect to the 180 deg.

Figure 3:
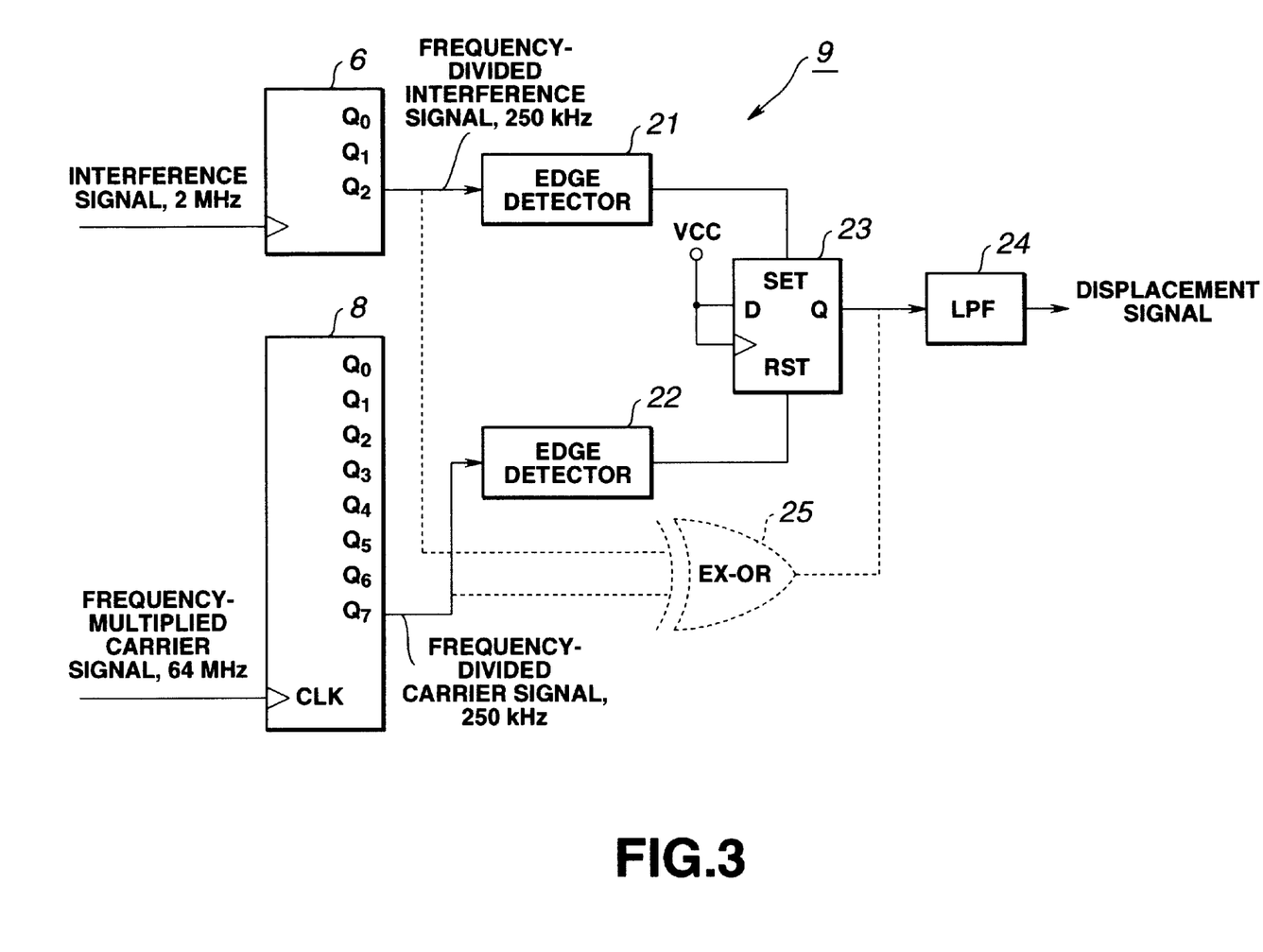
FIG. 3 is a block diagram of an interference signal counter, carrier signal counter and phase demodulator included in the displacement measuring apparatus in FIG. 2.

The phase demodulator circuit 9 may not be the above-mentioned one comprising the first and second edge detector circuits 21 and 22, and D flip-flop circuit 23, but it may be a one using an EX-OR (exclusive-or) circuit 25 indicated with a dash line in FIG. 3 and of which the output is high when the frequency-divided interference and carrier signals are coincident with each other, to detect a displacement of the object 2.

The phase demodulator circuit 9 using the EX-OR circuit 25 provides a displacement signal which will be zero when the phase difference between the frequency-divided interference and carrier signals is 90 or 270 deg. In this case, the dynamic range of the output displacement signal from the circuit 9 is ±90 deg.

The displacement measuring apparatus 1 having the aforementioned construction produces a displacement signal indicative of a displacement of the object 2 by modulating, by the phase demodulator circuit 9, the phase of an interference signal produced by modulating the displacement of the object 2. The displacement signal varies linearly with respect to the displacement of the object 2. Therefore, the displacement measuring apparatus 1 can measure a displacement of the object 2 with a considerably higher resolution than the conventional displacement measuring apparatus of the fringe counting type.

Figure 4:
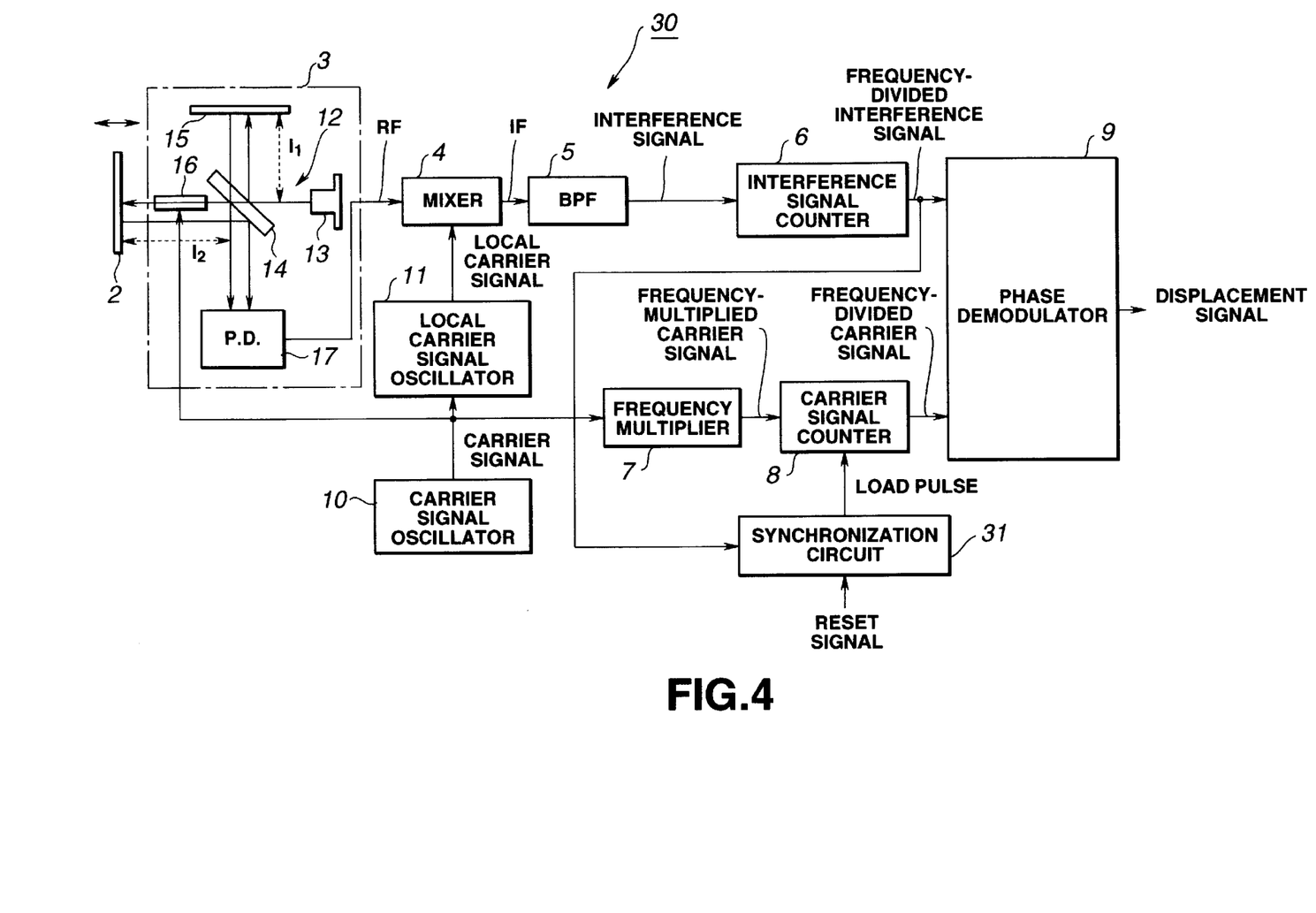
FIG. 4 is a block diagram of a schematic block diagram of a second embodiment of the displacement measuring apparatus according to the present invention.

Next, the second embodiment of the displacement measuring apparatus according to the present invention will be described herebelow with reference to FIG. 4 showing the second embodiment of the present invention in the form of a block diagram of a schematic block diagram.

Note that the second embodiment has same components as those included in the aforementioned displacement measuring apparatus 1 according to the first embodiment. Such same components are indicated in FIG. 4 with same references as in FIG. 2, and so will not be described in detail any longer.

In FIG. 4, the displacement measuring apparatus according to the second embodiment is generally indicated with a reference 30. The displacement measuring apparatus 30 comprises a probe 3 to irradiate a laser beam to an object 2 under measurement and produce an RF signal by modulating a displacement of the object 2, mixer circuit 4 to convert the RF signal to an IF signal, BPF 5 to filter the IF signal, interference signal counter 6 to count the leading edge, for example, of the IF signal filtered by the BPF 5 (this filtered IF signal will be referred to as and "interference signal" hereinafter) to produce a frequency-divided interference signal, frequency multiplier circuit 7 to multiply the frequency of the carrier signal to produce a frequency-multiplied carrier signal, carrier signal counter 8 to count the leading edge, for example, of the frequency-multiplied carrier signal to produce a frequency-divided carrier signal, phase demodulator circuit 9 to demodulate the phase of the frequency-divided interference signal on the basis of the frequency-divided carrier signal to produce a displacement signal indicative of a displacement of the object 2, carrier OSC 10 to produce a carrier signal, local OSC 11 to produce a local carrier signal on the basis of the carrier signal, and a synchronization circuit 31 to synchronize a reset signal with the frequency-divided interference signal to produce a load pulse for supply to the carrier signal counter 8.

The synchronization circuit 31 is supplied with a reset signal when the user presses a reset button or the like. The synchronization circuit 31 synchronizes the reset signal with a frequency-divided interference signal output from the interference signal counter 6. For example, the synchronization circuit 31 synchronizes the reset signal with the leading edge of the frequency-divided interference signal, to produce a load pulse by differentiating the reset signal synchronized with the frequency-divided interference signal. The load pulse thus produced is supplied to the carrier signal counter 8.

Figure 5:
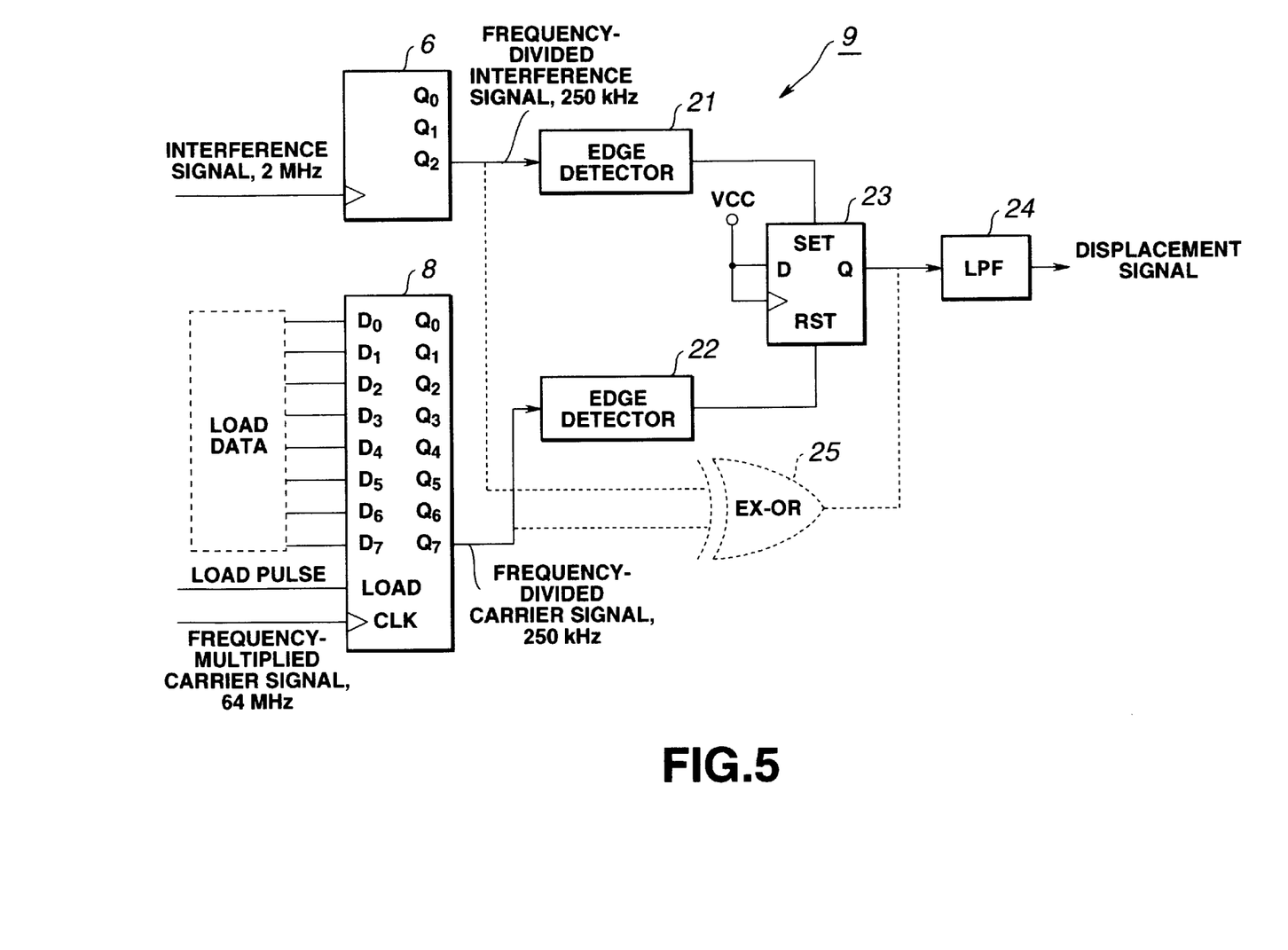
FIG. 5 is a block diagram of an interference signal counter, carrier signal counter and phase demodulator included in the displacement measuring apparatus in FIG. 4.

Next, the interference signal counter 6, carrier signal counter 8 and the phase demodulator 9 included in the displacement measuring apparatus 30 according to the second embodiment will further be described with reference to FIG. 5.

The load pulse produced by the synchronization circuit 31 is supplied to a load terminal (LOAD) provided at the carrier signal counter 8 which will then load a previously latched load data ($D_0$ to $D_7$) as an output data to output terminals ($Q_0$ to $Q_7$). Therefore, when the carrier signal counter 8 is supplied with a load pulse, it will clear the output data and provide a new load data.

The carrier signal counter 8 latches as a load data in advance a data in which a displacement signal provided from the phase demodulator circuit 9 becomes zero. That is, the carrier signal counter 8 will latch as a load data a data having such a predetermined phase difference with respect to a frequency-divided interference signal that a displacement signal provided from the phase demodulator circuit 9 is zero.

The load data varies depending upon the demodulation method adopted in the phase modulator circuit 9. For example, if the phase demodulator circuit 9 adopts the aforementioned D flip-flop circuit 23, the displacement signal output becomes zero when the phase difference between the frequency-divided interference and carrier signals is 180 deg. Therefore, if the carrier signal counter 8 is a 3-bit 256-ary counter, 0 (00000000 when it is binary) is latched as a load data in advance. If the phase demodulator circuit 9 uses the aforementioned EX-OR circuit 25, the displacement signal output will be zero when the phase difference between the frequency-divided interference and carrier signals is 90 or 270 deg. Therefore, if the carrier signal counter 8 is an 8-bit 256-ary counter, 64 or 192 (01000000 or 11000000 when it is binary) is latched as a load data in advance.

Figure 6:
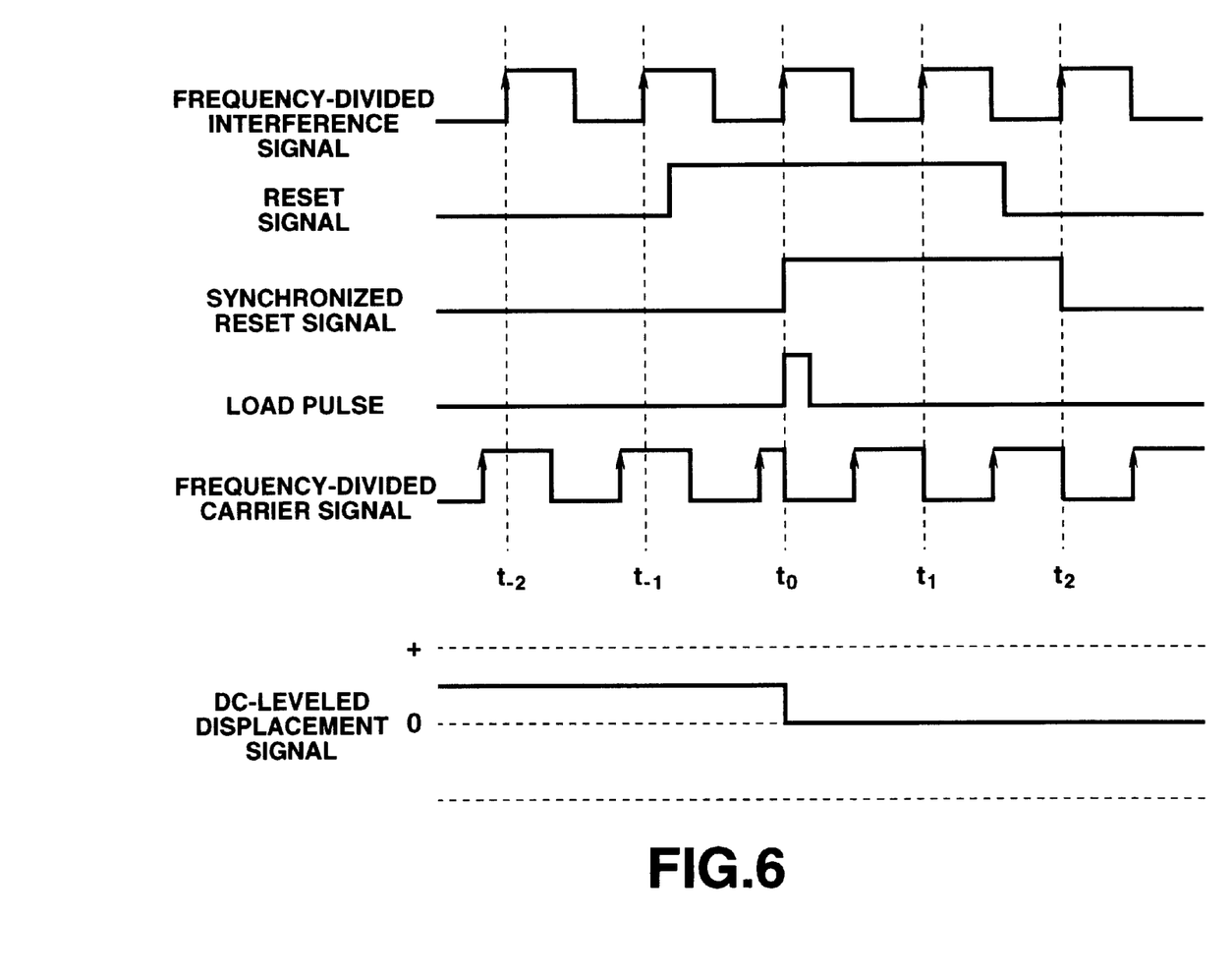
FIG. 6 is a time chart for explanation of the resetting timing in the displacement measuring apparatus of the present invention.

FIG. 6 is a time chart of various signals in the displacement measuring apparatus 30.

First, assume that there occurs a predetermined phase difference between the frequency-divided interference and carrier signals and the displacement signal is not zero (at time $t_{-2}$), for example. When a reset signal is supplied (at a time between times $t_{-1}$ and $t_0$), it will be synchronized with the leading edge of the frequency-divided interference signal 9 (at the time $t_0$). And the reset signal synchronized with the frequency-divided interference signal is differentiated to produce a load pulse.

When the carrier signal counter 8 (at time $t_0$) is supplied with the load pulse, it will provide a load data and a frequency-divided carrier signal provided from the most significant bit (MSB) vary. At this time, if the phase demodulator circuit 9 adopts the D flip-flop circuit 23, a frequency-divided carrier signal is provided of which the phase is shifted 180 deg. from the frequency-divided interference signal. When the frequency-divided interference signal having the phase difference of 180 deg. is supplied, the displacement signal output will be zero.

In the displacement measuring apparatus 30 described above, the synchronization circuit 31 provides a load pulse produced by synchronizing the reset signal with the frequency-divided interference signal. Since the carrier signal counter 8 can provide a load data upon supply of the load pulse, the displacement signal can be zeroed irrespectively of the position of the object 2.

Thus, the displacement measuring apparatus 30 can measure a displacement of the object 2 with reference to a fixed position of the object 2.

The load data loaded to the carrier signal counter 8 in the displacement measuring apparatus 30 is such a value that the displacement signal output becomes zero. Note however that in the present invention, the load data value is not limited. According to the present invention, a load data may be loaded which has such a value that the displacement signal output would have a predetermined offset, for example. In this case, the value the displacement signal takes when the object 2 is at the reference position can freely be set by the user, which leads to an improved operability of the displacement measuring apparatus.

In the foregoing, the present invention have been described concerning the displacement measuring apparatuses 1 and 30 in which an RF signal detected from the probe 3 is converted to an IF signal. However the present invention is not limited to these embodiments, but the displacement measuring apparatus according to the present invention may be adapted to directly count the RF signal provided from the probe 3 by means of the interference signal counter 6. Also, the present invention has been described concerning the displacement measuring apparatuses 1 and 30 in which a carrier signal is frequency-multiplied by the frequency multiplier circuit 7, and then demultiplied or divided by the carrier signal counter 8. However the present invention is not limited to these embodiments, but the displacement measuring apparatus according to the present invention may be adapted to directly count the carrier signal the carrier signal counter 6. That is, in the present invention, if the center frequency of a frequency-divided interference signal provided from the interference signal counter 6 is identical to the frequency of the frequency-divided carrier signal provided from the carrier signal counter 8, the frequency division and multiplication ratios are not limited.

Also in the foregoing, the present invention has been described concerning displacement measuring apparatuses 1 and 30 in which the laser diode 13 is used as the laser source. However the present invention is not limited to these embodiments, but the displacement measuring apparatus according to the present invention may use a helium neon laser as the laser source. Also, a laser light emitted from a laser diode or helium neon laser may be transmitted through an optical fiber and irradiated to the object 2 and reference mirror 15.

Furthermore, the present invention has been described concerning displacement measuring apparatuses 1 and 30 in which the light modulator 16 is disposed in the forward path of the laser light between the beam splitter 14 and object 2. However the present invention is not limited to these embodiments, but the light modulator 16 may be disposed in the backward path of the laser light between the beam splitter 14 and object 2, or in the forward or backward path of the laser light between the beam splitter 14 and reference mirror 15. Alternatively, the light modulators 16 may be disposed in both the forward and backward optical paths, respectively, near the object 2 or reference mirror 15.

In the displacement measuring apparatus according to the present invention, an interference light produced by interference between a reflected light from the reference mirror and a one from an object under measurement, is converted to an electrical signal. The electrical signal is phase-demodulated on the basis of a carrier signal to detect a displacement of the object. Thus, the displacement measuring apparatus of the present invention can detect a displacement of the object with a high resolution.

Also in the displacement measuring apparatus according to the present invention, when a reset signal synchronized with an interference signal is supplied, a frequency-divided carrier signal is produced which has with respect to a frequency-divided signal such a phase difference that an output signal after phase-demodulated takes a predetermined value, a phase difference between the frequency-divided carrier and interference signals is detected, and the interference signal is phase-demodulated. Thereby, the displacement measuring apparatus of the present invention can zero-reset or offset a detection output irrespectively of the position of the object, thus the apparatus is easily operable.

What is claimed is:

1. A displacement measuring apparatus, comprising:

an interference optical system incorporating a laser source emitting a laser light beam for irradiating a reference mirror and an object under measurement and a light modulator to optically modulate one of a laser light beam irradiating the reference mirror and a laser light beam irradiating the object by using a carrier signal of a predetermined frequency, said interface optical system being adapted to produce an interference light by interference between reflected laser beams from the reference mirror and the object, respectively;

a photo-detecting element to receive the interference light and detect an interference signal therefrom;

displacement detecting means for detecting a displacement of the object by demodulating a phase of the interference signal on the basis of the carrier signal;

means for dividing a frequency of the interference signal at a predetermined ratio to reproduce a frequency-divided interference signal;

carrier-signal frequency means for dividing the predetermined frequency of the carrier signal at a ratio to produce an output frequency identical to a center frequency of the frequency-divided interference signal, to thereby produce a frequency-divided carrier signal; and means for synchronizing a reset signal fed to the carrier-signal frequency dividing means with the frequency-divided interference signal, wherein the carrier-signal frequency dividing means produces, upon receiving the reset signal synchronized with the interference signal, a frequency-divided carrier signal having relative to the frequency-divided interference signal a phase difference, whereby an output after being phase demodulated by the displacement detecting means has a predetermined value, and the displacement detecting means detects a phase difference between the frequency divided carrier and interference signals and demodulates the phase of the interference signal.

* * * * *